US007483032B1

(12) United States Patent
Yeoh et al.

(10) Patent No.: US 7,483,032 B1
(45) Date of Patent: Jan. 27, 2009

(54) ZERO FRAME BUFFER

(75) Inventors: Sonny S. Yeoh, San Jose, CA (US); Shane J. Keil, San Jose, CA (US); Dennis K. Ma, San Jose, CA (US); Peter C. Tong, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 370 days.

(21) Appl. No.: 11/253,438

(22) Filed: Oct. 18, 2005

(51) Int. Cl.
*G06F 12/00* (2006.01)
*G06F 15/16* (2006.01)
*G06F 12/08* (2006.01)

(52) U.S. Cl. ....................... 345/519; 345/541; 345/536; 345/568; 711/147; 711/100; 711/203; 711/206

(58) Field of Classification Search ................. 345/530, 345/536, 501, 506, 541, 544–545, 554, 565, 345/568, 543, 519; 711/1, 5, 115, 147–149, 711/153, 173, 202–209, 221, 2–3, 6, 100, 711/130–131, 138
See application file for complete search history.

(56) References Cited

U.S. PATENT DOCUMENTS 6,108,014 A * 8/2000 Dye ........................... 345/544
6,138,222 A * 10/2000 Wyde et al. ................. 711/172
6,336,180 B1 * 1/2002 Long et al. ..................... 712/34
2002/0057446 A1 * 5/2002 Long et al. ................. 358/1.13
2003/0021455 A1 * 1/2003 Dixon et al. ................ 382/132
2005/0027930 A1 * 2/2005 Klein et al. ................. 711/105
2005/0249029 A1 * 11/2005 Fujisaki et al. ........... 365/233.5
2006/0176309 A1 * 8/2006 Gadre et al. ................ 345/501
2006/0187226 A1 * 8/2006 Bruno et al. ................ 345/534
2006/0279577 A1 * 12/2006 Bakalash et al. ............ 345/502

* cited by examiner

*Primary Examiner*—Wesner Sajous
(74) *Attorney, Agent, or Firm*—Townsend and Townsend and Crew LLP; J. Matthew Zigmant

(57) ABSTRACT

Circuits, methods, and apparatus that allow the elimination of a frame buffer connected directly to a graphics processing unit. The graphics processing unit includes an on-chip memory. Following system power-up or reset, the GPU initially renders comparatively low-resolution images to the on-chip memory for display. Afterward, the GPU renders images, which are typically higher resolution, and stores them in a system memory, apart from the graphics processing unit. The on-chip memory, which is no longer needed for image storage, instead stores address information, referred to as page tables, identifying the location of data stored by the GPU in the separate system memory.

23 Claims, 10 Drawing Sheets

ZERO FRAME BUFFER

BACKGROUND

The present invention relates to graphics processing systems in general, and more particularly to zero frame buffer graphics processing systems.

Graphics processing units (GPUs) are included as a part of computer, video game, car navigation, and other electronic systems in order to generate graphics images on a monitor or other display device. The first GPUs to be developed stored pixel values, that is, the actual displayed colors, in a local memory, referred to as a frame buffer.

Since that time, the complexity of GPUs, in particular the GPUs designed and developed by NVIDIA Corporation of Santa Clara, Calif., has increased tremendously. Data stored in these frame buffers has similarly increased in size and complexity. This data now includes not only pixel values, but also textures, texture descriptors, shader program instructions, and other data and commands. These frame buffers are now often referred to as graphics memories, in recognition of their expanded roles. The term frame buffer continues to be commonly used, however.

One attribute of the frame buffer that has not changed is its location. The frame buffer is still intimately associated with the graphics processor. For example, graphics processing cards typically have a graphics processing unit and one or more memory devices for the frame buffer. One reason has been the limited bandwidth to other portions of the electronic system that has been available to the graphics processing unit. Until recently, in computer systems, the GPU has communicated with the CPU and other devices over an advanced graphics port, or AGP bus. While faster versions of this bus were developed, it always remained behind the actual needs of the GPU. Accordingly, the frame buffer remained close to the GPU, where access was not limited by the AGP bus bottleneck.

However, a new bus has been developed, an enhanced version of the peripheral component interconnect (PCI) standard, or PCIE (PCI express). This bus protocol has been greatly improved and refined by NVIDIA Corporation of Santa Clara, Calif. This in turn has now allowed a rethinking of the location of the frame buffer.

Accordingly, what is needed are circuit, methods, and apparatus that take advantage of this increased data bus bandwidth to eliminate the frame buffer previously required by graphics processing units.

SUMMARY

Accordingly, embodiments of the present invention provide circuits, methods, and apparatus that allow the elimination of a frame buffer connected directly to a graphics processing unit. That is, it allows for a zero-sized frame buffer, or "zero frame buffer."

One exemplary embodiment of the present invention provides a graphics processing unit that includes a memory referred to as a buffered fast response RAM or BFR. Following system power-up or reset, the GPU initially renders comparatively low-resolution images to the BFR for display. Afterward, the GPU renders images, which are typically higher resolution, and stores them in a system memory. The BFR, which is no longer needed for image storage, instead stores address information, referred to as page tables, identifying the location of data stored by the GPU in the system memory. Various embodiments may include one or more of these or the other features described herein.

Another exemplary embodiment of the present invention provides an integrated circuit. This integrated circuit includes a first memory comprising a plurality of memory cells, a graphics pipeline coupled to the first memory and configured to initially store graphics data in the plurality of memory cells, and further configured to later store graphics data in a second memory. The second memory is external to the integrated circuit. The integrated circuit further includes a first logic circuit coupled to the memory and configured to store a page table in the plurality of memory cells once graphics data is stored in the second memory. The page table includes entries identifying physical addresses for the graphics data stored in the second memory.

Yet another embodiment of the present invention provides a computer system. This computer system includes a central processing unit, a first graphics processing unit integrated circuit, and a bridge device coupling the central processing unit to the graphics processing unit. In this embodiment, the graphics processing unit integrated circuit is not directly connected to an external memory.

Another embodiment of the present invention provides a method of generating graphics information. This method includes providing power to a graphics processing unit, the graphics processing unit comprising a first memory, storing first graphics data in the first memory, allocating memory cells in a second memory for use by the graphics processing unit, the second memory separate from the graphics processing unit, storing second graphics data in the second memory, and storing a page table in the first memory. The page table includes entries identifying locations for the second graphics data stored in the second memory.

Still another embodiment of the present invention provides a graphics card having no memory device. The graphics card includes a printed circuit board, a PCIE connector attached to the printed circuit board, and a graphics processing unit integrated circuit attached to the printed circuit board. The graphics processing unit includes a first memory configured to initially store graphics data generated by the graphics processing unit, and configured to later store a page table. The page table includes physical addresses for graphics data stored in a second memory, and the second memory is external to the graphics card.

A better understanding of the nature and advantages of the present invention may be gained with reference to the following detailed description and the accompanying drawings.

DESCRIPTION OF EXEMPLARY EMBODIMENTS

Figure 1:
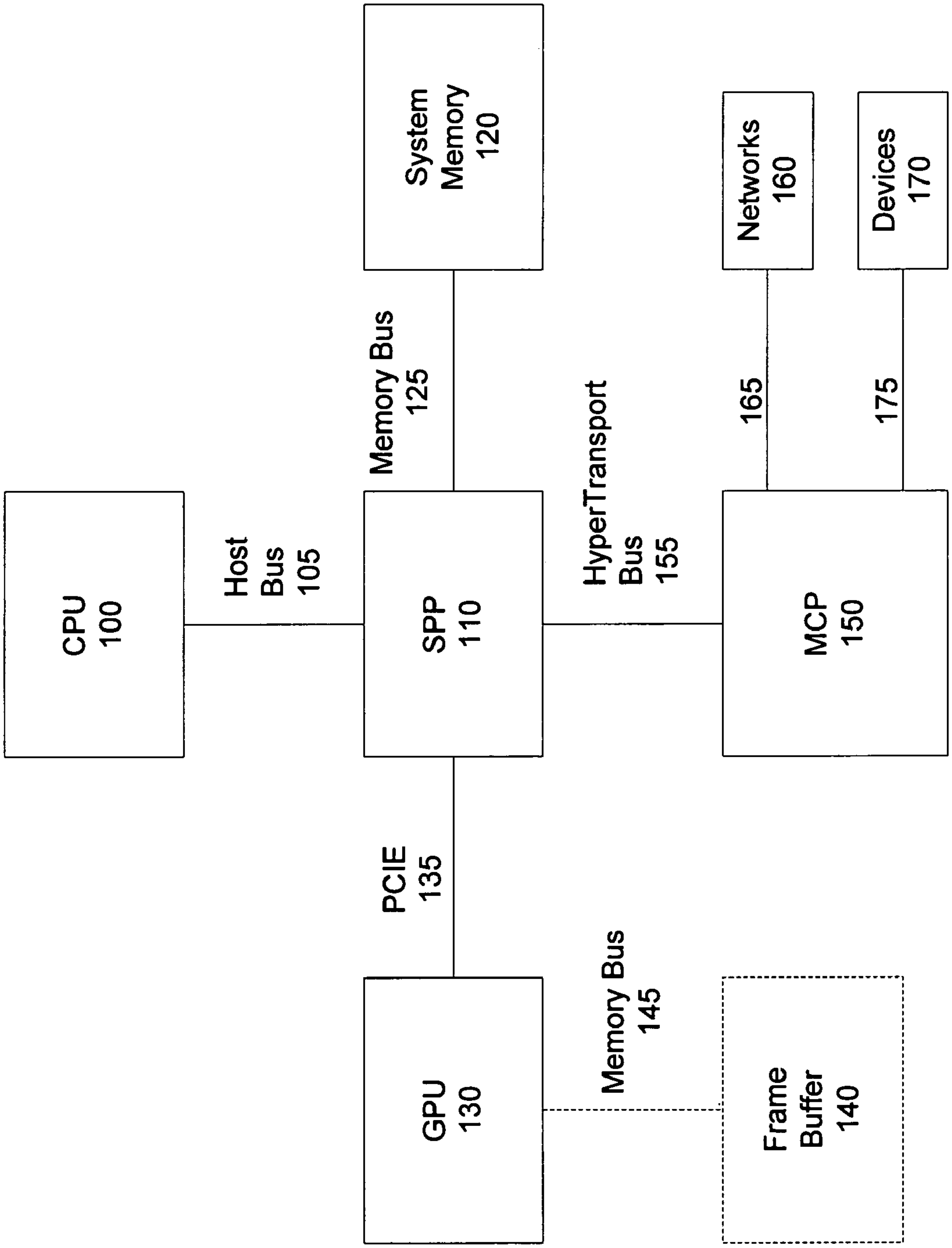
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, media communications processor (MCP) 150, networks 160, and internal and peripheral devices 170. A frame buffer, local, or graphics memory 140 is also included but shown by dashed lines. The dashed lines indicate that while conventional computer systems include this memory, embodiments of the present invention provide for and allow its removal. This figure, as with the other included figures, is shown for illustrative purposes only, and does not limit either the possible embodiments of the present invention or the claims.

The CPU 100 connects to the SPP 110 over the host bus 105. The SPP 110 is in communication with the graphics processing unit 130 over a PCIE bus 135. The SPP 110 reads and writes data to and from the system memory 120 over the memory bus 125. The MCP 150 communicates with the SPP 110 via a high-speed connection such as a HyperTransport bus 155, and connects network 160 and internal and peripheral devices 170 to the remainder of the computer system. The graphics processing unit 130 receives data over the PCIE bus 135 and generates graphic and video images for display over a monitor or other display device (not shown).

The CPU 100 may be a processor, such as those manufactured by Intel Corporation or Advanced Micro Devices, more likely the former, or other supplier, and are well-known by those skilled in the art. The SPP 110 and MCP 150 are commonly referred to as a chipset. The memory 120 is often a number of dynamic random access memory devices arranged in a number of the dual in-line memory modules (DIMs). The graphics processing unit 130, SPP 110, and MCP 150 are preferably manufactured by NVIDIA Corporation of Santa Clara, Calif.

The graphics processing unit 130 may be located on a graphics card, while the CPU 100, system platform processor 110, system memory 120, and media communications processor 150 may be located on a computer system motherboard. The graphics card, including the graphics processing unit 130, is typically data printed circuit board with the graphics processing unit attached. The printed circuit board to typically includes a connector, for example a PCI connector, also attached to the printed circuit board, that fits into a PCIE slot included on the motherboard.

A computer system, such as the illustrated computer system, may include more than one GPU 130. Additionally, each of these graphics processing units may be located on a separate graphics card. Two or more of these graphics cards may be joined together by a jumper or other connection. One such technology, the pioneering SLI™, has been developed by NVIDIA Corporation of Santa Clara, Calif. In other embodiments of the present invention, one or more GPUs may be located on one or more graphics cards, while one or more others are located on the motherboard.

In previously developed computer systems, the GPU 130 communicated with the system platform processor 110 or other device, at such as a Northbridge, via an AGP bus. Unfortunately, the AGP buses were not able to supply the needed data to the GPU 130 at the required rate. Accordingly, a frame buffer 140 was provided for the GPU's use. This memory allowed access to data without the data having to traverse the AGP bottleneck.

A faster bus protocol, the PCIE standard, has now become available. Notably, an improved PCIE bus has been developed by NVIDIA Corporation of Santa Clara, Calif. Accordingly, the bandwidth from the GPU 130 to the system memory 120 has been greatly increased. Thus, embodiments of the present invention provide and allow for the removal of the frame buffer 140.

Accordingly, embodiments of the present invention provide and allow the graphics processing unit 130 to not connect directly to a separate memory device, such as a DRAM. For example, a graphics card including the graphics processing unit 130 does not require a separate memory device or DRAM. As such, embodiments of the present invention provide a savings that includes not only these absent DRAMs, but additional savings as well. For example, a voltage regulator is typically used to control the power supply to the memories, and capacitors are used to provide power supply filtering. Removal of the DRAMs, regulator, and capacitors provides a cost savings that reduces the bill of materials (BOM) for the graphics card. Moreover, board layout is simplified, board space is reduced, and graphics card testing is simplified. These factors reduce research and design, and other engineering and test costs, thereby increasing the gross margins for graphics cards incorporating embodiments of the present invention.

While this embodiment provides a specific type computer system that may be improved by the incorporation of an embodiment of the present invention, other types of electronic or computer systems may also be improved. For example, video and other game systems, navigation, set-top boxes, pachinko machines, and other types of systems may be improved by the incorporation of embodiments of the present invention.

Also, while these types of computer systems, and the other electronic systems described herein, are presently commonplace, other types of computer and other electronic systems are currently being developed, and others will be developed in the future. It is expected that many of these may also be improved by the incorporation of embodiments of the present invention. Accordingly, the specific examples listed are explanatory in nature and do not limit either the possible embodiments of the present invention or the claims.

Figure 2:
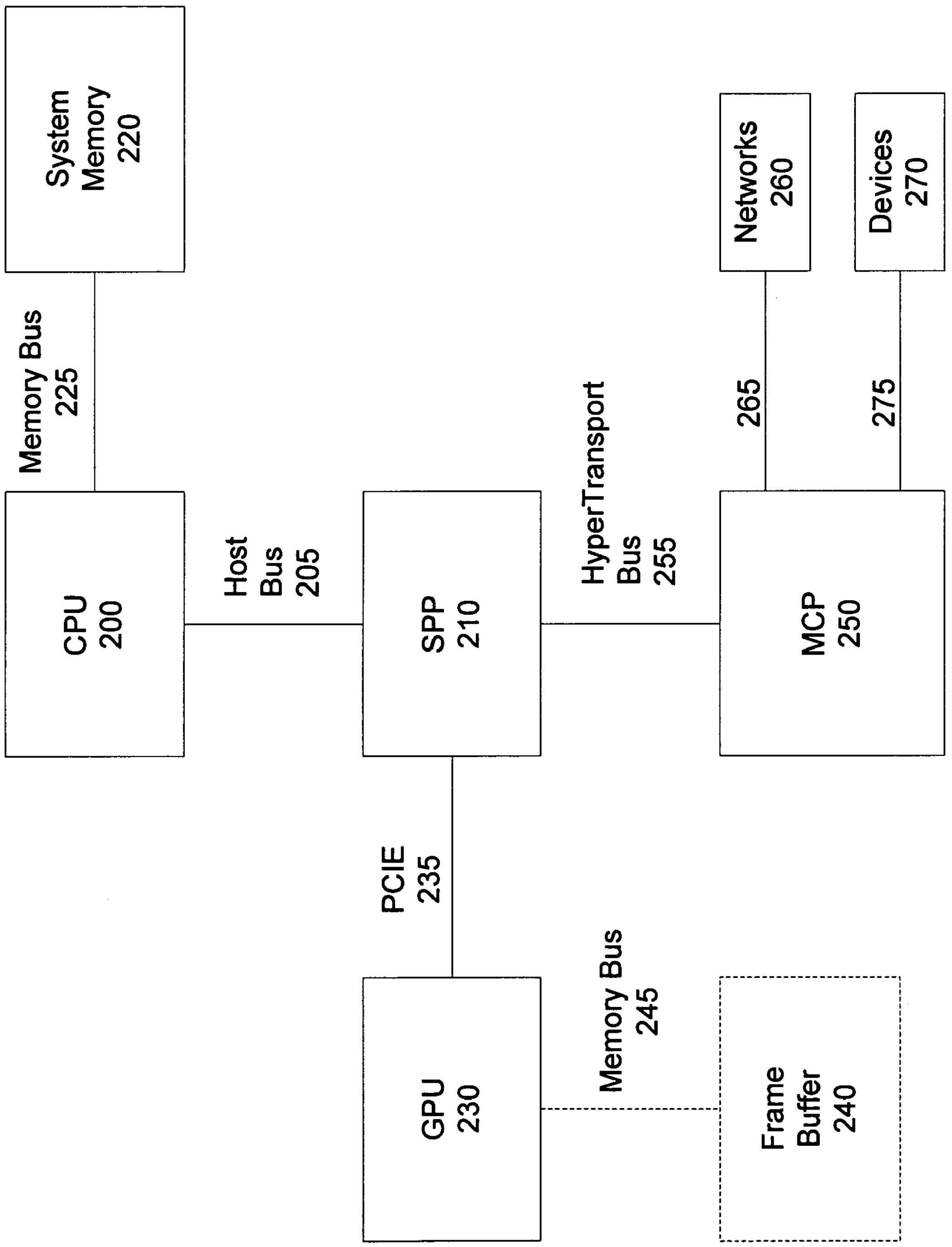
FIG. 2 is a block diagram of another computing system that is improved by incorporating an embodiment of the present invention.

FIG. 2 is a block diagram of another computing system that is improved by incorporating an embodiment of the present invention. This block diagram includes a central processing unit or host processor 200, SPP 210, system memory 220, graphics processing unit 230, MCP 250, networks 260, and internal and peripheral devices 270. Again, a frame buffer, local, or graphics memory 240 is included, but with dashed lines to highlight its removal.

The CPU 200 communicates with the SPP 210 via the host bus 205 and accesses the system memory 220 via the memory bus 225. The GPU 230 communicates with the SPP 210 over the PCIE bus 235 and the local memory over memory bus 245. The MCP 250 communicates with the SPP 210 via a high-speed connection such as a HyperTransport bus 255, and connects network 260 and internal and peripheral devices 270 to the remainder of the computer system.

As before, the central processing unit or host processor 200 may be one of the central processing units manufactured by Intel Corporation or Advanced Micro Devices, more likely the latter, or other supplier, and are well-known by those skilled in the art. The graphics processor 230, integrated graphics processor 210, and media and communications processor 240 are preferably provided by NVIDIA Corporation of Santa Clara, Calif.

The removal of the frame buffers 140 and 240 in FIGS. 1 and 2, and the removal of other frame buffers in other embodiments of the present invention, is not without its consequences. Specifically, at power-up of a computer system, the basic input/output system (BIOS) expects the GPU 130 to have a local frame buffer memory at its disposal. Thus, at system power-up, the GPU 130 does not allocated space in the system memory 120 for use by the graphics processor. Accordingly, at power-up, the graphics processor would ordinarily have no place to write data. At that time, the graphics processing unit 130 needs access to another memory, lest the monitor remain blank during system boot up.

One solution would be to modify the BIOS to allocate space in the system memory for the graphics processor at power-up. This would be particularly feasible in a controlled environment, such as an original equipment manufacturer's facility. However, this solution is not desirable at the retail level, where some zero frame buffer graphics cards are likely to be sold.

Accordingly, an on-chip memory is provided for use by the graphics processing unit 130 until space is allocated for use by the graphics processing unit 130 in the system memory 120. This on-chip memory may be referred to as a buffered fast response RAM or BFR. This memory is typically not large enough for a high-color, high-resolution images. Rather, it is typically large enough to store VGA type image, for example a splash screen often seen during computer system power-up. In a specific embodiment of the present invention, a 256 kbyte memory is used, though in other embodiments of the present invention, other sizes of memories may be used. After power-up and once the drivers for the graphics processing unit 130 and the operating system are running, space is allocated in the system memory 124 for use by the graphics processing unit 130, and the BFR is no longer needed for graphic data storage.

Figure 3:
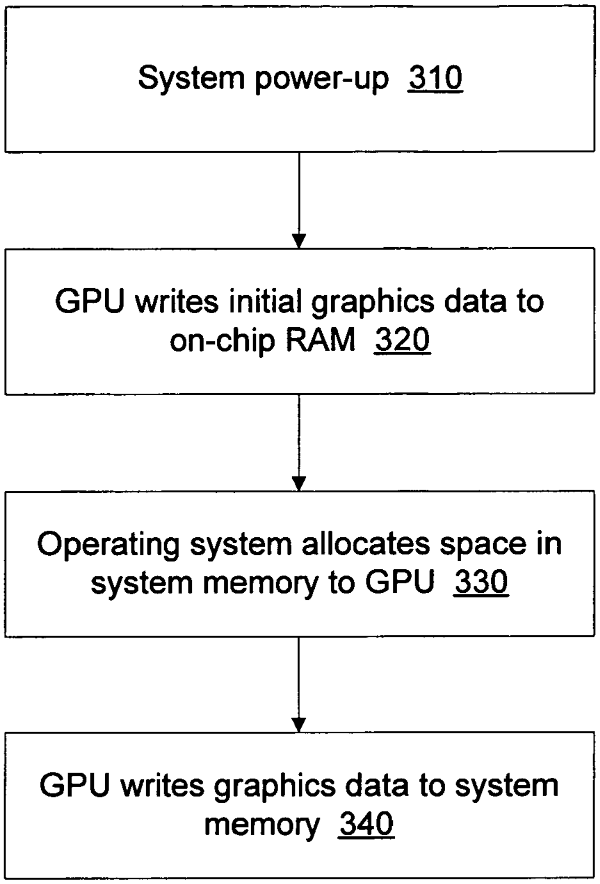
FIG. 3 is a flow chart of a method storing graphics data according to an embodiment of the present invention.

FIG. 3 is a flow chart of a method storing graphics data according to an embodiment of the present invention. In this method, a lower-color, lower-resolution image (or series of such images), such as a VGA compliant image, is stored in a memory on the graphics processing unit until the operating system allocates memory space in the system memory for use by the graphics processing unit 130. After that time, the graphics processing unit renders images, which are typically higher-color and high-resolution, to the system memory.

In act 310, the system is powered-up. Alternately, these acts may follow a reboot, reset, or other triggering event. In act 320, the graphics processing unit renders an initial, comparatively lower-color, lower-resolution graphics image to an on-chip memory. This on-chip memory may be a static random access memory (SRAM), or other type of memory.

In act 330, the operating system allocates space in a system memory for use by the graphics processing unit. In various embodiments, this may be the responsibility of the operating system, various drivers used by the graphics processing unit, or other circuitry or software. In act 340, the graphics processing unit writes graphics data to the system memory. This graphics data is typically for a comparatively higher-color, high-resolution series of images.

Figure 4A:
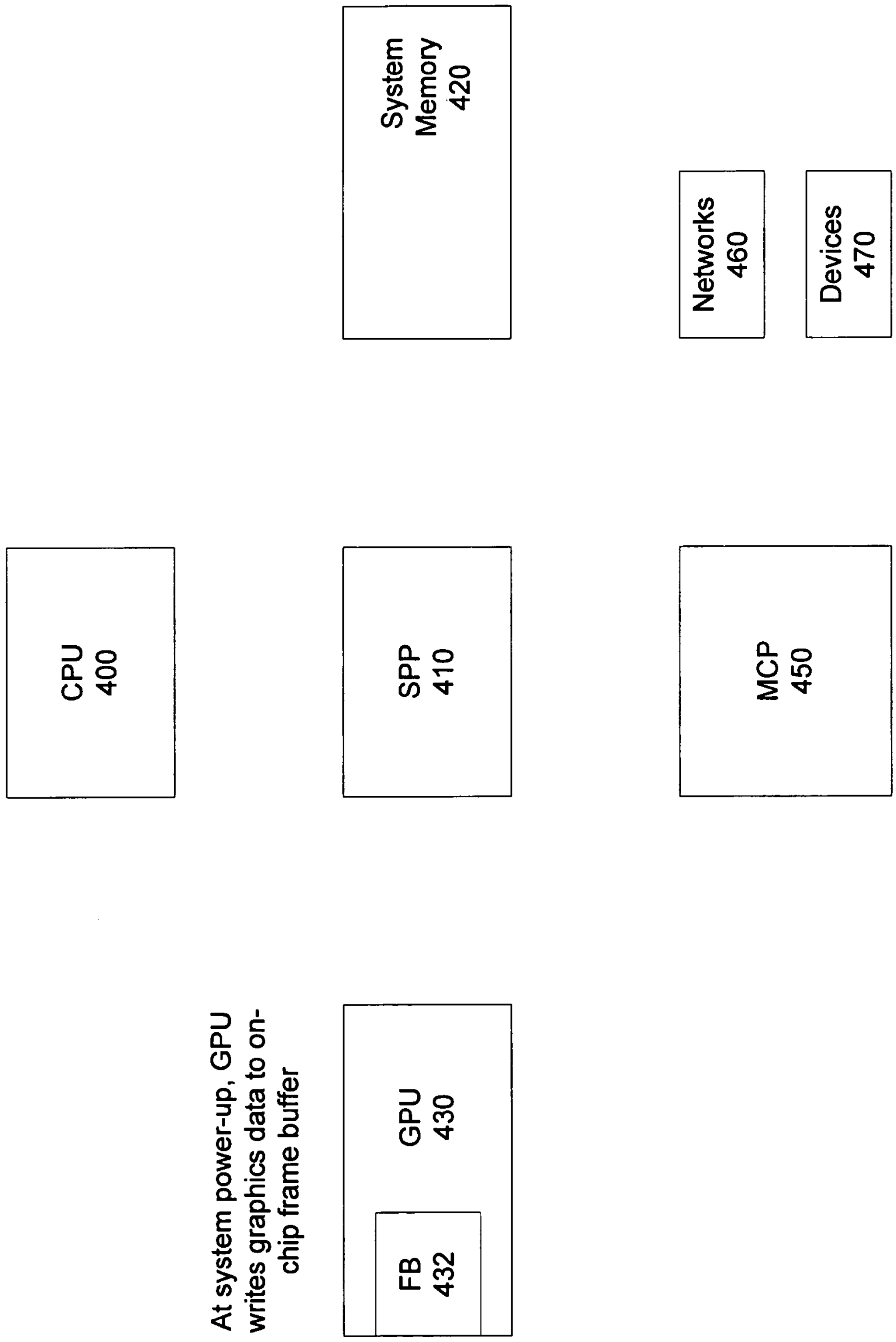
FIGS. 4A-C illustrated the transfer of data in a computer system during a method storing graphics data according to an embodiment of the present invention.
Figure 4B:
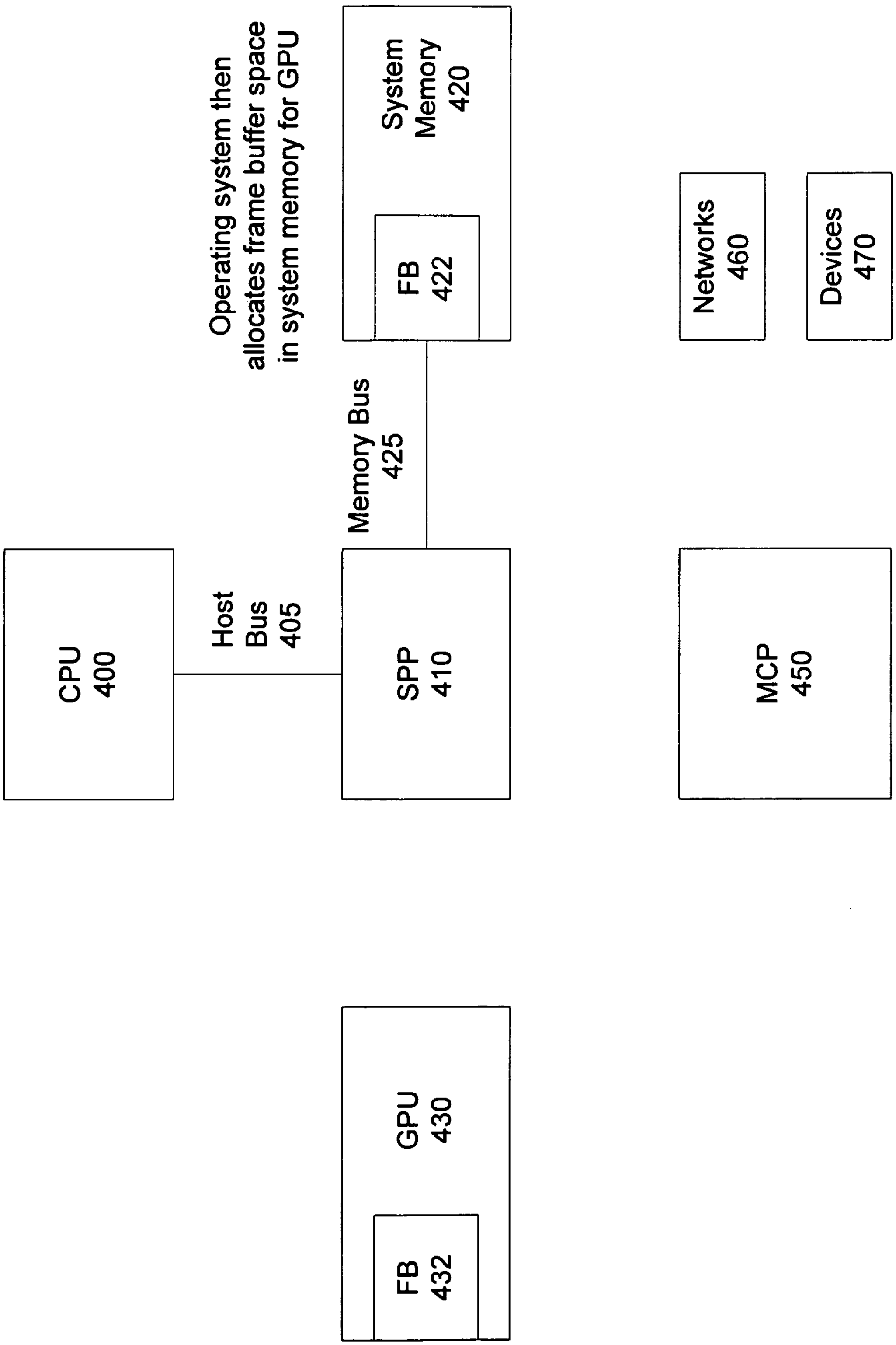
Figure 4C:
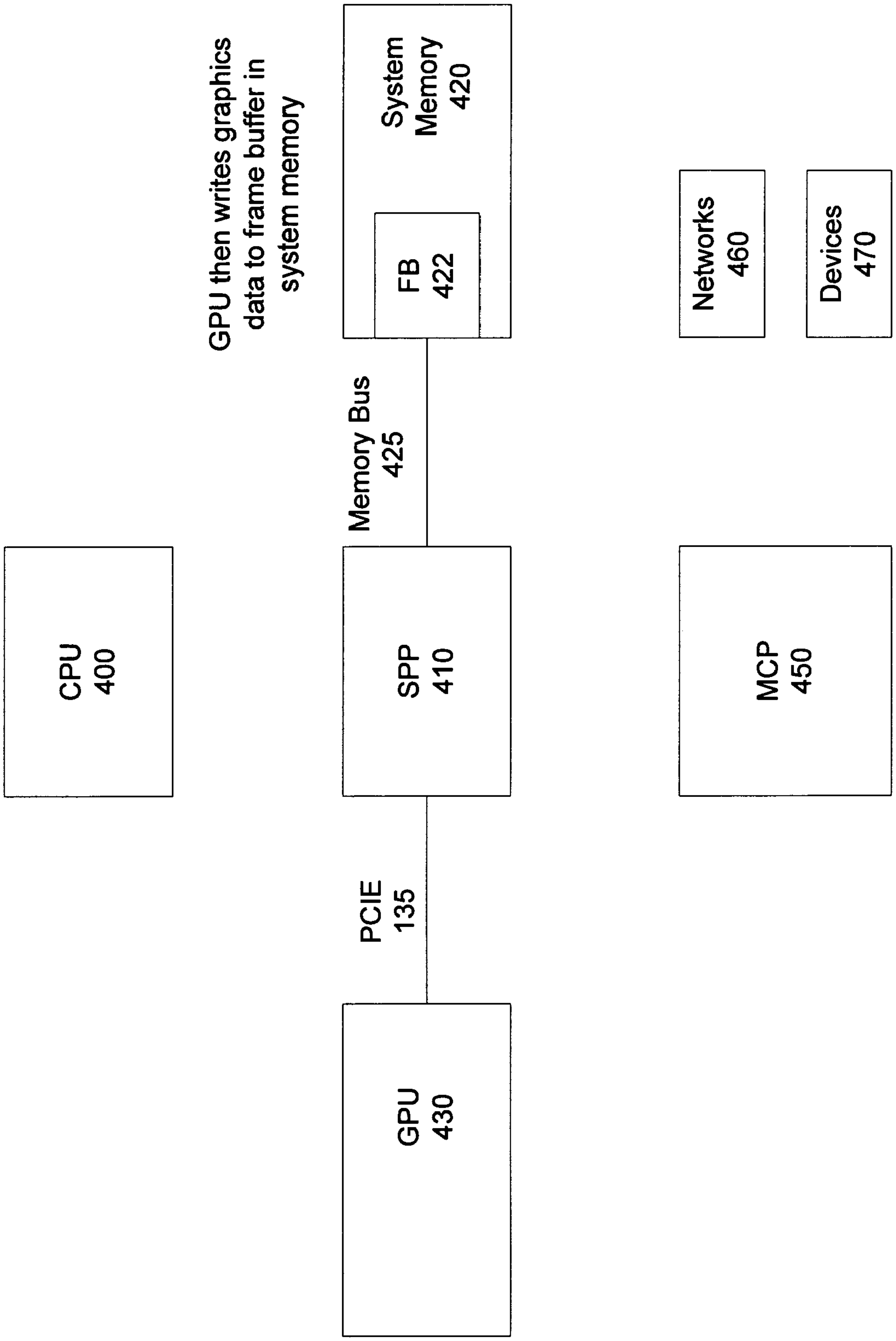

FIGS. 4A-C illustrated the transfer of data in a computer system during a method storing graphics data according to an embodiment of the present invention. In FIG. 4A, after the system powers-up, the graphics processing unit 430 writes graphics data to the on-chip frame buffer or BFR 432. Again, this data typically includes a lower resolution VGA image or series of images.

In FIG. 4B, the operating system allocates space for a frame buffer 422 in the system memory 420 for use by the graphics processing unit 430. While the frame buffer memory space 422 is shown as a contiguous unit in the system memory 420, this is usually not the case. Rather, the frame buffer 422 is typically allocated in several groupings of memory cells in the system memory 420.

The operating system running on the CPU 400 may be responsible for the allocation of frame buffer space 422 in the system memory 420. In various embodiments, drivers or other software used by the graphics processing unit 430 may be responsible for this task. In other embodiments, this task is shared by both the operating system and to these drivers.

In FIG. 4C, the graphics processing unit writes and reads graphics data to and from the frame buffer 422 and the system memory 420. This graphics data may include pixel values for display, textures, texture descriptors, shader program instructions, and other data and commands.

It should be noted that this data is typically much larger then the lower-color, lower-resolution data written to the on-chip memory or BFR during system power-up. Accordingly, the on-chip memory is insufficient in size to be used to store the higher-color, higher-resolution images that commonly follow. In theory, it is possible to increase the memory on the graphics processing unit to a sufficient size such that all graphics data is stored on-chip. However, the manufacturing process used in the manufacture of DRAMs is typically incompatible with the processing used to manufacture graphics processing units. Accordingly, other types of multi-transistor memory such as SRAMs would be used in place of DRAMs. This would lead to an increase in the cost of the graphics processing unit beyond reason.

The GPU 430 accesses the frame buffer 422 in the system memory 420 via the PCIE bus 435 and memory bus 425. In other embodiments of the present invention, other buses besides the PCIE bus 435 may be used. For example, other buses that have been currently developed, are currently being developed, or will be developed in the future, may be used in place of the PCIE bus 435.

The removal of a local frame buffer that is directly connected to a graphics processing unit leads to a second consequence. This problem is a timing problem that can lead to a deadlock condition. In various embodiments of the present invention, there are different ways which a deadlocked condition may manifest itself. Often, such problems arises because a page table used by a graphics processing unit is stored in a frame buffer located in a separate system memory.

These page tables contain entries that translate virtual addresses used by the graphics memory into physical addresses used by the system memory. These page tables can be translation lookaside buffers that translate virtual addresses into physical addresses.

After data is written to a frame buffer in a system memory, for example by a central processing unit, the graphics processing unit needs to access the page table to determine the location where data is to be written. Accordingly, the graphics processing unit initiates a read to find this address in the page table stored in the system memory. However, the write command from the central processing unit has already issued and is ahead of this read command. Since the write command requires information from read command to be executed, a deadlocked condition can arise.

One solution is to make use of the virtual channel VC1 that is part of the PCIE specification. If the write command uses virtual channel VC0, a read commands using virtual channel VC1 could bypass the write command, allowing the instructions to be processed in their logical order. However, conventional chip sets do not allow access to the virtual channel VC1. Further, while NVIDIA Corporation of Santa Clara, Calif. could implement such a solution in a product in manner consistent with the present invention, interoperability with other devices makes it undesirable to do so at the present time, though in the future this may change.

Another solution involves prioritizing or tagging these commands. For example, the read command in the above example could be flagged with a high-priority tag. In this way, the read command could go ahead of the write command, began removing the deadlocked. This solution has similar interoperability concerns as the above solution.

Yet another solution is to use the graphics processing units on-chip memory to store page table entries identifying the location in system of data stored by the graphics processing unit. Again, this memory stores graphics data during the system power-up until space in the system memory is allocated for use by the graphics processing unit. Accordingly, this on-chip memory is available after that time, and can be used to store page table entries for the graphics processing unit.

Having the page tables stored on-chip reduces the access time for a page table read. It also provides an independent path for these page table reads, thus avoiding deadlocks. Further, bandwidth utilization to the system memory is reduced, since these page table lookups do not require transactions over the PCIE and memory buses.

Figure 5:
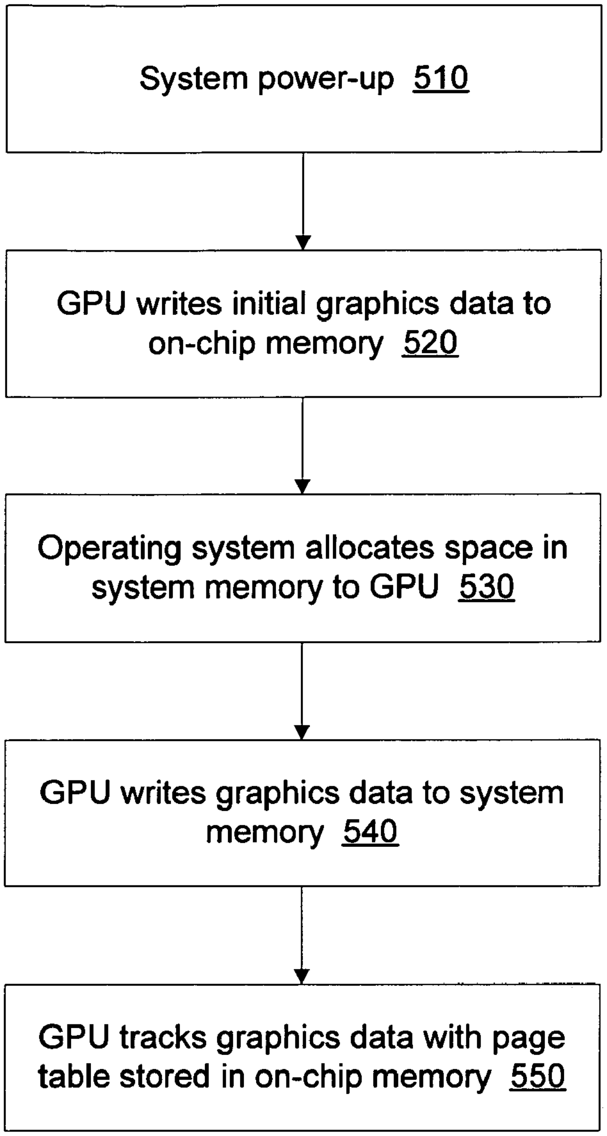
FIG. 5 is a method of using a memory to first store graphics data, then to store page table entries according to an embodiment of the present invention.

FIG. 5 is a method of using a memory to initially store graphics data, then later to store page table entries, according to an embodiment of the present invention. In this method, an on-chip memory, or BFR, is used initially to store graphics data generated by a graphics processing unit following a system power-up. After memory space is allocated in a system memory by an operating system or other circuit or software, the graphics processing unit utilizes that space, freeing-up the on-chip memory. This on-chip memory is then used for storing a page table that tracks locations of data stored in the system memory by the graphics processing unit.

Specifically, in act 510 the system is powered up. Again, these acts may follow a power reset, initialization, or other event. In act 520, the graphics processing unit writes initial graphics data to the on-chip memory. In act 530, the operating system allocates space or memory locations in the system memory for use by the graphics processing unit. Again, this may be done by the operating system, graphics processor drivers, by other software or circuitry, or a combination thereof.

In act 540, the GPU writes graphics data to the system memory. Again, this data typically includes final pixel values, intermediate pixel values, textures, texture descriptors, shader program instructions, device drivers, and other information. Again, this data is typically far too large to be practicably stored on the graphics processing unit.

In act 550, the graphics processing unit tracks the storage of this graphics data in a system memory using a page table stored in the on-chip or BFR memory. As before, in one embodiment of the present invention, this memory is 256 kbytes in size. In this embodiment, 252 kbytes of the 256 kbyte memory is used for the page table. This size works well when data is allocated by the system memory in 4 kbyte units. If larger units are allocated by the system memory, the size of the page table memory can be reduced.

Figure 6:
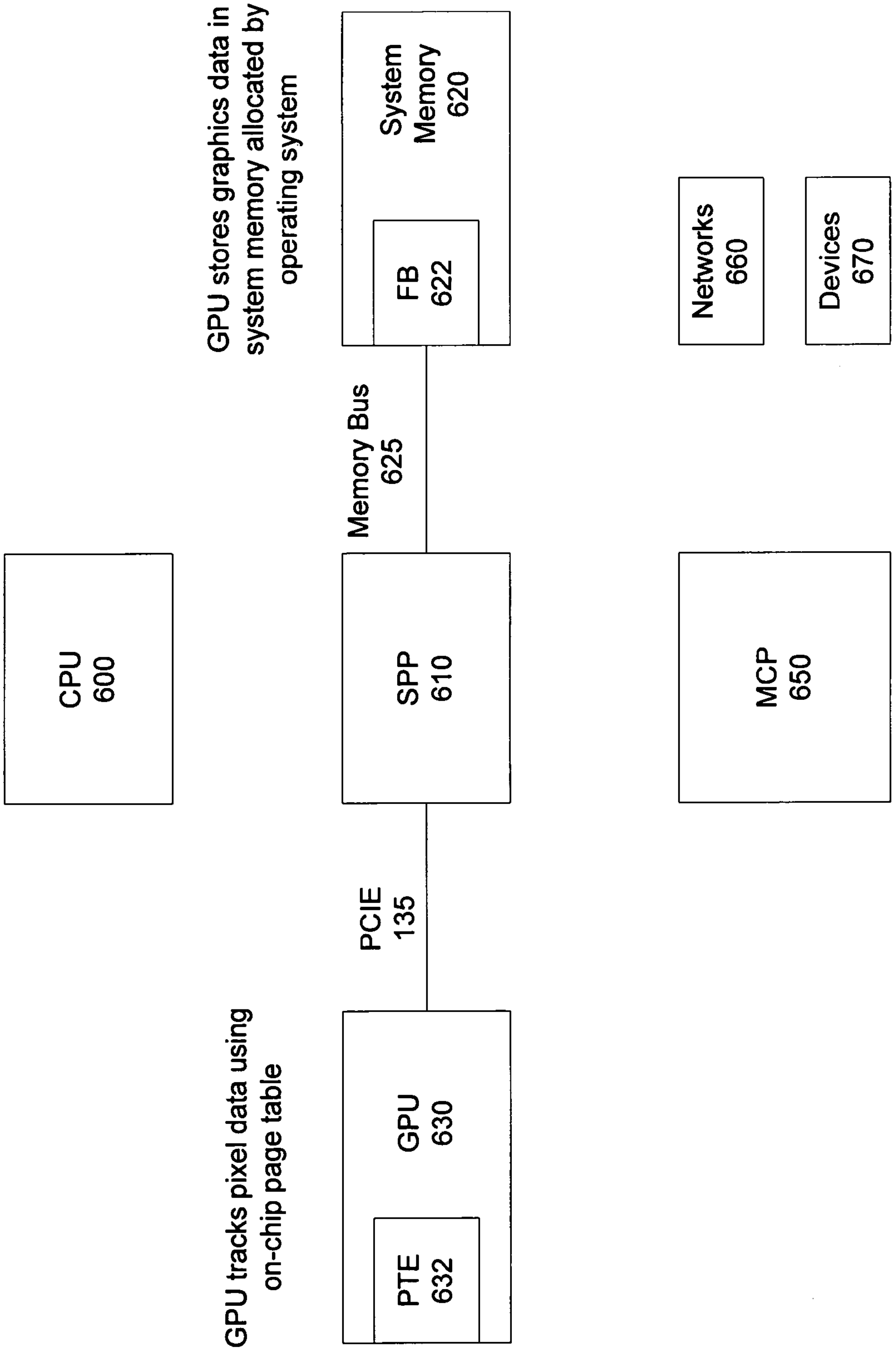
FIG. 6 illustrates the transfer of data while storing page table entries in a memory on a graphics-processor according to an embodiment of the present invention.

FIG. 6 illustrates the location of data while storing page table entries in a memory on a graphics processor according to an embodiment of the present invention. The graphics processing unit 630 stores page table entries in the memory or BFR 632. The GPU 630 also stores graphics data in the frame buffer 622, which is located in the system memory 620.

Figure 7:
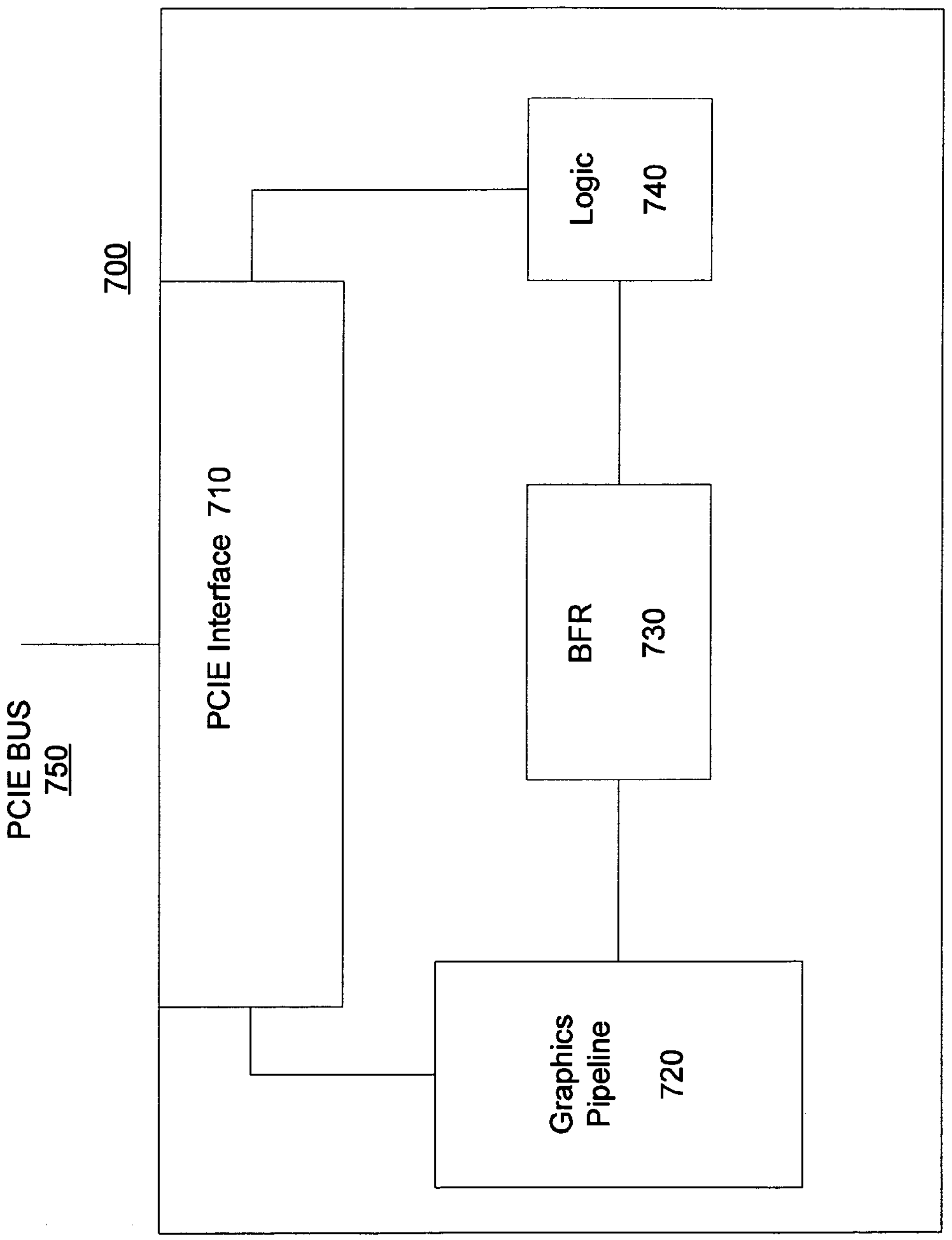
FIG. 7 is a block diagram of a graphics processing unit consistent with an embodiment of the present invention.

FIG. 7 is a block diagram of a graphics processing unit consistent with an embodiment of the present invention. This block diagram of a graphics processing unit 700 includes a PCIE interface 710, graphics pipeline 720, memory or BFR 730, and logic circuit 740. The PCIE interface 710 transmits and receives data over the PCIE bus 750. Again, in other embodiments of the present invention, other types of buses currently developed or being developed, and those that will be developed in the future, may be used. The graphics processing unit is typically formed on an integrated circuit, though in some embodiments more than one integrated circuit may comprise the GPU 700.

The graphics pipeline 720 receives data from the PCIE interface and renders data for display on a monitor or other device. The BFR or memory 730 stores initial graphics data, and later stores page table entries identifying locations in a system memory. The logic circuit 740 controls the setup of the page table in the BFR 730 and direct entries to be stored there.

Figure 8:
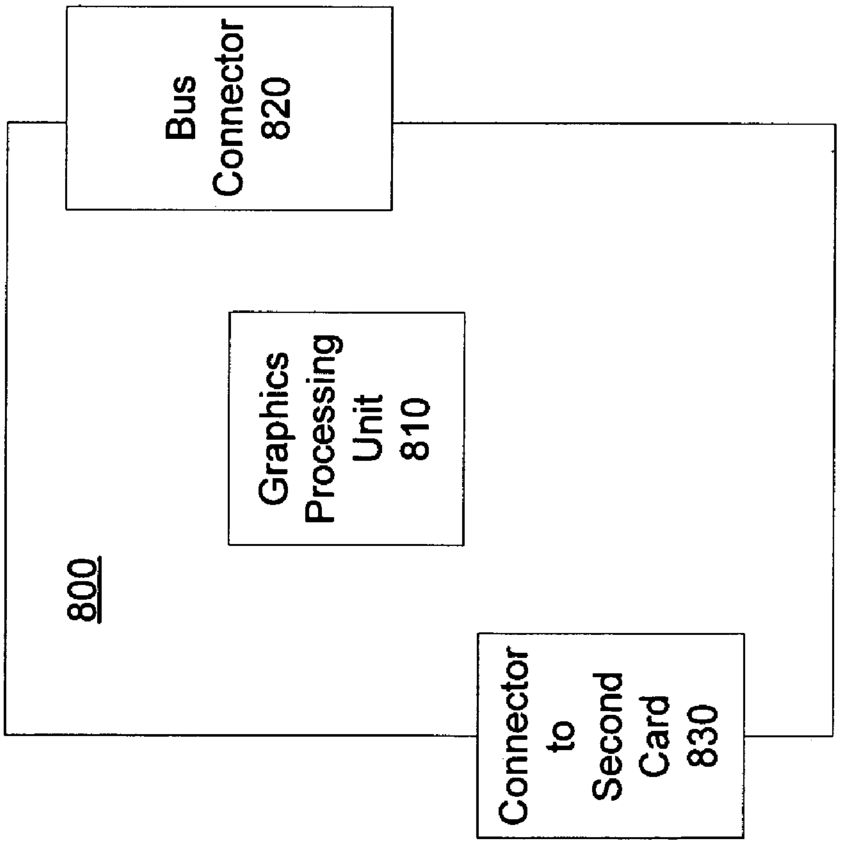
FIG. 8 is a diagram illustrating a graphics card according to an embodiment of the present invention.

FIG. 8 is a diagram illustrating a graphics card according to an embodiment of the present invention. The graphics card 800 includes a graphics processing unit 810, a bus connector 820, and a connector to a second graphics card 830. The bus connector 828 may be a PCIE connector designed to fit a PCIE slot, for example a PCIE on slot on a computer system's motherboard. The connector to a second card 830 may be configured to fit a jumper or other connection to one or more other graphics cards. Other devices, such as a power supply regulator and capacitors, may be included. It should be noted that a memory device is not included on this graphics card.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:

a first memory comprising a plurality of memory cells;

a graphics pipeline coupled to the first memory and configured to initially store first graphics data in the plurality of memory cells, and further configured to later store second graphics data in a second memory, the second memory external to the integrated circuit; and a first logic circuit coupled to the first memory and configured to overwrite the first graphics data with a page table in the plurality of memory cells once second graphics data is stored in the second memory, the page table comprising entries identifying physical addresses for the second graphics data stored in the second memory.

2. The integrated circuit of claim 1 wherein the second memory is a system memory.

3. The integrated circuit of claim 2 wherein the page table comprises a translation lookaside buffer configured to translate virtual addresses used by the graphics processor integrated circuit to physical addresses used by the system memory.

4. The integrated circuit of claim 1 further comprising a Peripheral Component Interconnect Express (PCIE) interface, wherein the integrated circuit stores second graphics data in the second memory via the PCIE interface.

5. The integrated circuit of claim 1 wherein once graphics data is stored in the second memory, graphics data is not stored in the first memory.

6. A computer system comprising:

a central processing unit;

a first graphics processing unit integrated circuit; and a bridge device coupling the central processing unit to the first graphics processing unit integrated circuit;

wherein the first graphics processing unit integrated circuit is not directly connected to an external memory, the first graphics processing unit integrated circuit comprises a memory configured to initially store graphics data, and configured to later store a page table, the page table comprising physical addresses for graphics data stored in a system memory, the system memory external to the first graphics processing unit integrated circuit, wherein the bridge device, the central processing unit, and the system memory are located on a first printed circuit board and the first graphics processing unit integrated circuit is located on a second printed circuit board having a connector configured to fit in a Peripheral Component Interconnect Express (PCIE) slot located on the first printed circuit board, and wherein there is no memory device on the second printed circuit board.

7. The computer system of claim 6 wherein the page table comprises a translation lookaside buffer configured to translate virtual addresses used by the first graphics processing unit integrated circuit to physical addresses used by the system memory.

8. The computer system of claim 6 wherein the first graphics processing unit integrated circuit is coupled to the bridge device by a PCIE bus.

9. The computer system of claim 6 further comprising a second graphics processing unit integrated circuit, wherein the second graphics processing unit integrated circuit is located on a third printed circuit board configured to fit in a second PCIE slot located on the first printed circuit board.

10. The computer system of claim 9 wherein there is no memory device on the third printed circuit board, and the second printed circuit board and third printed circuit board are coupled by a jumper.

11. The computer system of claim 6 wherein after the memory in the first graphics processing unit integrated circuit is configured to store a page table, the memory in the first graphics processing unit integrated circuit is configured to not store graphics data.

12. A method of generating graphics information comprising:

providing power to a graphics processing unit, the graphics processing unit comprising a first memory;

storing first graphics data in a first plurality of memory cells of the first memory;

allocating memory cells in a second memory for use by the graphics processing unit, the second memory separate from the graphics processing unit;

storing second graphics data in the second memory; and storing a page table in the first memory using at least some of the first plurality of memory cells previously used to store first graphics data, the page table comprising entries identifying locations for the second graphics data stored in the second memory.

13. The integrated circuit of claim 12 wherein the second memory is a system memory.

14. The integrated circuit of claim 13 wherein the page table comprises a translation lookaside buffer configured to translate virtual addresses used by the graphics processor to physical addresses used by the system memory.

15. The method of claim 12 wherein the second graphics data is stored in the second memory via a Peripheral Component Interconnect Express (PCIE) bus.

16. The method of claim 12 wherein after the page table is stored in the first memory, the first graphics data is not stored in the first memory.

17. A graphics card comprising:

a printed circuit board;

a Peripheral Component Interconnect Express (PCIE) connector attached to the printed circuit board; and a graphics processing unit integrated circuit attached to the printed circuit board and comprising:

a first memory to initially store graphics data generated by the graphics processing unit, and to later store a page table and not store graphics data, the page table comprising physical addresses for graphics data stored in a second memory, the second memory external to the graphics card.

18. The graphics card of claim 17 wherein the page table comprises a translation lookaside buffer configured to receive virtual addresses used by the graphics processor and provide physical addresses used by the second memory.

19. The graphics card of claim 17 further comprising:

a second connector configured to attach a jumper to form a connection with a second graphics card.

20. The graphics card of claim 17 wherein the first memory overwrites the graphics data with the page table.

21. A computer system comprising:

a central processing unit;

a first graphics processing unit integrated circuit; and a bridge device coupling the central processing unit to the first graphics processing unit integrated circuit;

wherein the first graphics processing unit integrated circuit is not directly connected to an external memory, wherein the bridge device, the central processing unit, and the system memory are located on a first printed circuit board and the first graphics processing unit integrated circuit is located on a second printed circuit board having a connector configured to fit in a Peripheral Component Interconnect Express (PCIE) slot located on the first printed circuit board, and wherein there is no memory device on the second printed circuit board.

22. The computer system of claim 21 further comprising a second graphics processing unit integrated circuit, wherein the second graphics processing unit integrated circuit is located on a third printed circuit board configured to fit in a second PCIE slot located on the first printed circuit board.

23. The computer system of claim 22 wherein there is no memory device on the third printed circuit board, and the second printed circuit board and third printed circuit board are coupled by a jumper.

* * * * *